(12) United States Patent
Gustafson

(10) Patent No.: US 9,233,795 B2
(45) Date of Patent: Jan. 12, 2016

(54) CONCRETE WALL CHUTE

(71) Applicant: John Henry Associates, Inc., Oxford, CT (US)

(72) Inventor: Richard A. Gustafson, Orange, CT (US)

(73) Assignee: John Henry Associates, Inc., Oxford, CT (US)

( * ) Notice: Subject to any disclaimer, the term of this patent is extended or adjusted under 35 U.S.C. 154(b) by 0 days.

(21) Appl. No.: 13/765,728

(22) Filed: Feb. 13, 2013

(65) Prior Publication Data

US 2013/0213762 A1    Aug. 22, 2013

Related U.S. Application Data

(60) Provisional application No. 61/598,556, filed on Feb. 14, 2012.

(51) Int. Cl.
| | | |
|---|---|---|
| *B65G 11/00* | (2006.01) | |
| *B65G 11/18* | (2006.01) | |
| *E04G 21/04* | (2006.01) | |
| *E04G 17/00* | (2006.01) | |

(52) U.S. Cl.
CPC .............. *B65G 11/18* (2013.01); *E04G 17/002* (2013.01); *E04G 21/0481* (2013.01)

(58) Field of Classification Search
CPC .......................... E04G 21/0481; B28C 5/4248
USPC ........................................ 141/331, 340; 193/5
See application file for complete search history.

(56) References Cited

U.S. PATENT DOCUMENTS

| | | | | |
|---|---|---|---|---|
| 5,665,045 A | * | 9/1997 | Brucker | ........................... 493/87 |
| 5,732,753 A | * | 3/1998 | Danzi et al. | ................... 141/340 |
| 6,460,581 B1 | | 10/2002 | Marshall et al. | |
| 6,868,953 B1 | * | 3/2005 | Thompson | ....................... 193/10 |
| 6,969,226 B2 | * | 11/2005 | Raley | ............................ 414/725 |

OTHER PUBLICATIONS

Precise Forms, Inc. (Web Catalog), Nov. 26, 2010, See section under "Pouring Boards" a desciption of the flanged model is provided in addtion to a picture (not seen in the catalog but is next to the catalog in the pdf.) http:/web, archive.org/web/20101126164155/http://preciseforms.com/cgi-bin/precise_forms/catalog.pl?cat=OO2 &item=520.*

* cited by examiner

*Primary Examiner* — Gene Crawford
*Assistant Examiner* — Lester Rushin
(74) *Attorney, Agent, or Firm* — Wiggin and Dana LLP; Gregory S. Rosenblatt; Robert J. Kasten

(57) ABSTRACT

A chute for use in pouring concrete into a wall form includes a floor with front, rear and side edges; sides connected to the floor along each of the side edges and projecting upward from the floor; a first flange connected to the floor along the front edge and projecting downward therefrom; and a second flange connected to the floor and projecting downward therefrom. The flanges are substantially parallel and spaced apart by a distance greater than a thickness of a wall form panel; accordingly, placing the chute on top of the wall form panel with the flanges respectively interior and exterior to the wall form securely aligns the chute with the wall form panel. The flanges project downward at approximately a 45° angle. Concrete deposited into the chute is funneled toward the front, and flows off the front edge into the wall form.

9 Claims, 6 Drawing Sheets

CONCRETE WALL CHUTE

CROSS-REFERENCE TO RELATED APPLICATION

This patent application claims a benefit to the filing date of U.S. Provisional Patent Application Ser. No. 61/598,556, titled "Concrete Wall Chute," that was filed on Feb. 14, 2012. The disclosure of U.S. 61/598,556 is incorporated by reference herein in its entirety.

FIELD OF THE DISCLOSURE

This disclosure relates to building concrete structures, and more particularly to efficiently placing mixed concrete into concrete wall form panels during the construction of concrete foundations.

BACKGROUND OF THE DISCLOSURE

In construction of a concrete wall, a form is typically built with panels defining a space into which the concrete is poured; the space between the panels determines the thickness of the wall. The concrete is delivered via a chute from a mixing truck. Particularly when the form is narrower than the truck's delivery chute, it may be difficult to pour the concrete into the form without spillage.

Several arrangements have been proposed for funneling concrete from a mixing truck's chute into a narrow form space. U.S. Pat. No. 6,460,581 describes an upside down pyramidal funnel which straddles both sides of a concrete block wall and is used to place mortar inside hollow cores of a block wall. U.S. Pat. No. 5,732,753 describes a cylindrical funnel with a diameter greater than the wall thickness, and with guides projecting downward into the wall form space to permit sliding the funnel along the wall. The funnel in these arrangements is located directly above the space to be filled with concrete. This impedes a worker's ability to move the concrete as desired to fill the form efficiently. Accordingly, there remains a need for a concrete pouring arrangement where concrete is delivered to the form efficiently and with greater freedom of movement for the worker.

SUMMARY OF THE DISCLOSURE

The present disclosure addresses the above-described need by providing a chute for use in pouring concrete into a wall form. According to an aspect of the disclosure, the chute includes a floor with a front edge, a rear edge and side edges; sides connected to the floor along each of the side edges and projecting upward from the floor; a first flange connected to the floor along the front edge and projecting downward therefrom; and a second flange connected to the floor and projecting downward therefrom. The first flange and the second flange are substantially parallel and spaced apart by a distance greater than a thickness of a wall form panel; accordingly, placing the chute on top of the wall form panel with the first flange interior to the wall form and the second flange exterior to the wall form securely aligns the chute with the wall form panel.

In an embodiment, the chute also includes a reinforcing gusset connected to the floor of the chute and projecting downward therefrom, and connected to the second flange. The floor advantageously has a trapezoidal shape with the rear edge longer than the front edge, so that concrete poured onto the floor of the chute is funneled toward the front. The first flange and the second flange project downward from the floor at an angle of approximately 45°, so that aligning the flanges with the wall form panel causes the floor to slope downwards toward the form at that angle.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Figure 1:
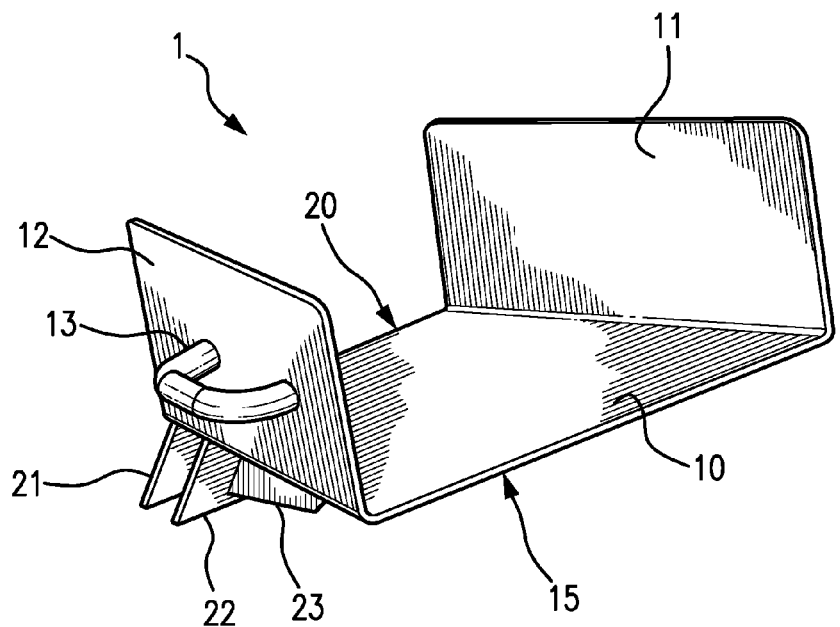
FIG. 1 is a rear perspective view of a concrete wall chute in accordance with an embodiment of the disclosure.
Figure 6:
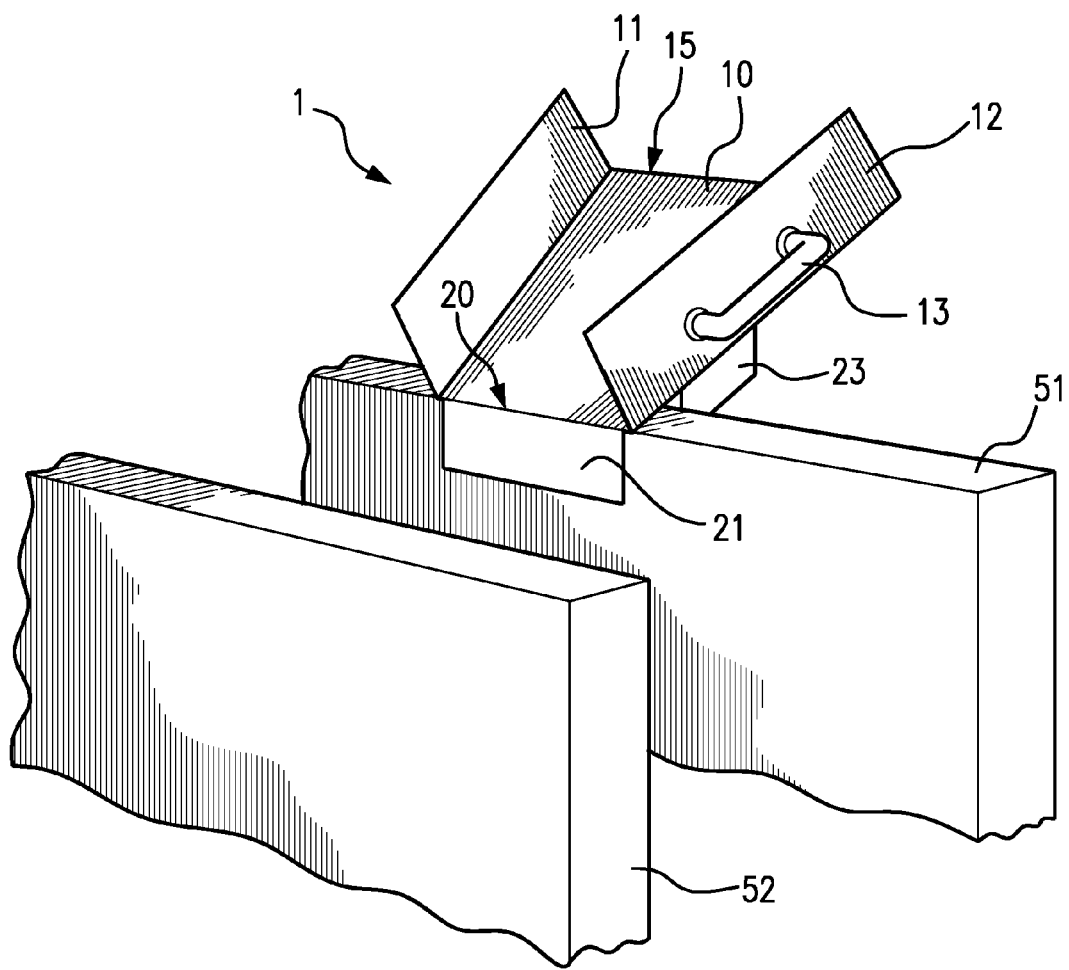
FIG. 6 is a front perspective view of the concrete wall chute of FIG. 1 in use.

FIG. 1 shows a concrete wall chute 1 according to an embodiment of the disclosure. The chute has a floor 10 and opposing sides 11, 12 projecting upwardly therefrom. The chute has a generally tapered shape; the floor of the chute is trapezoidal, with rear edge 15 longer than front edge 20. As illustrated in FIG. 6, rear edge 15 is the edge of chute 1 opposite the space between panels 50, 51 while near edge 20 is the edge of the chute 1 adjacent that space.

Figure 2:
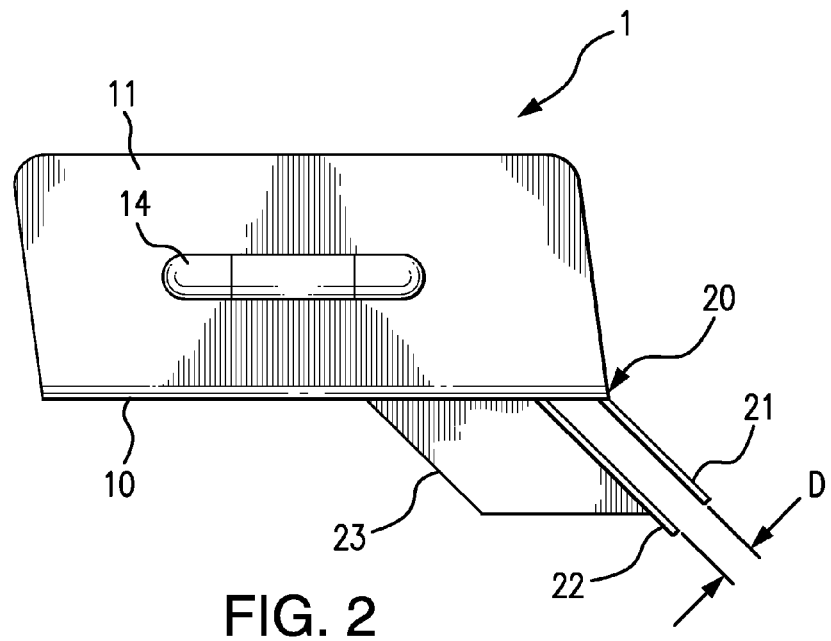
FIG. 2 is a side elevation view of the concrete wall chute of FIG. 1, showing the flanges projecting downward from the floor of the chute.

FIG. 2 is a side elevation view of wall chute 1. Two flanges 21, 22 project downwards from the floor 10 of the chute, at approximately a 45° angle. Flange 21 (called the inner flange) connects to the floor 10 along the front edge 20. Flange 22 (called the outer flange) is substantially parallel to flange 21 and displaced therefrom by a distance D slightly greater than the thickness T of a wall form panel (see FIG. 5). When used in pouring concrete into the form, the wall chute loosely but securely sits on top of a wall form panel, with inner and outer flanges 21, 22 adjacent to the inner and outer surfaces, respectively, of the form wall panel. The outer flange 22 has reinforcement gussets 23, connected to the floor 10, for added strength. The inner flange 21 allows the flow of concrete to be placed precisely inside the formed walls. Handles 13, 14 are welded to either side of the wall chute to easily pull and slide the wall chute along the wall form panels.

Figure 3:
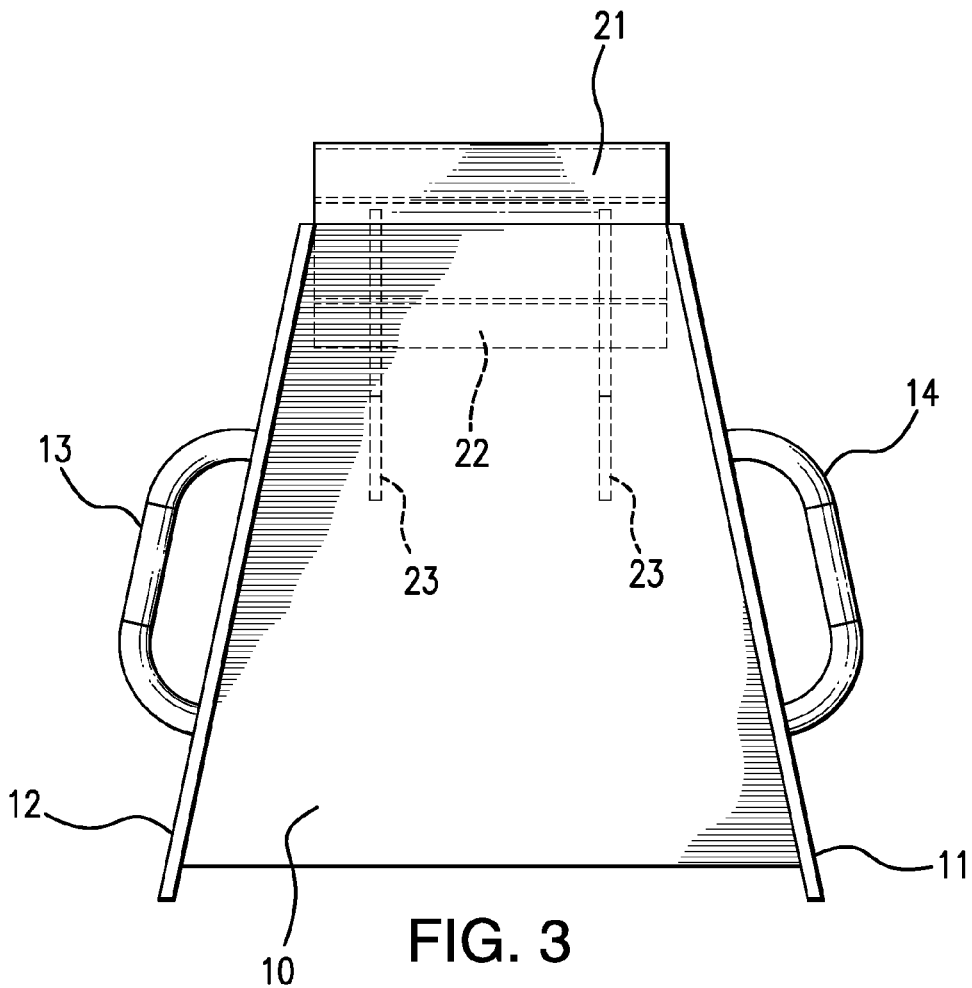
FIG. 3 is a plan view of the concrete wall chute of FIG. 1.
Figure 4:
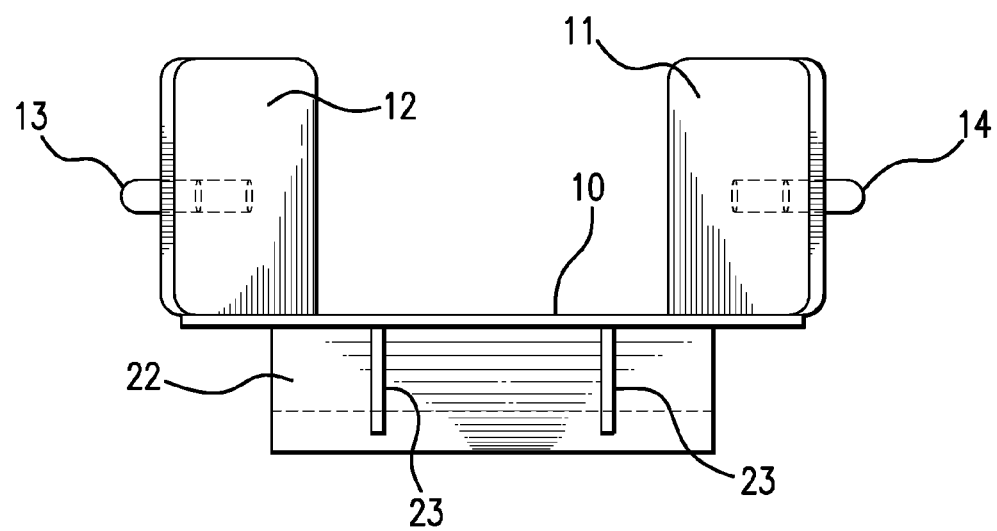
FIG. 4 is a rear elevation view of the concrete wall chute of FIG. 1.

FIG. 3 is a plan view of the chute, showing how floor 10 and sides 11, 12 form a funnel shape for the concrete being poured. FIG. 4 is a rear elevation view of the chute, showing the reinforcement gussets 23 mounted to the underside of floor 10 and to the rear surface of outer flange 22. In this embodiment, two reinforcement gussets are provided.

Figure 5:
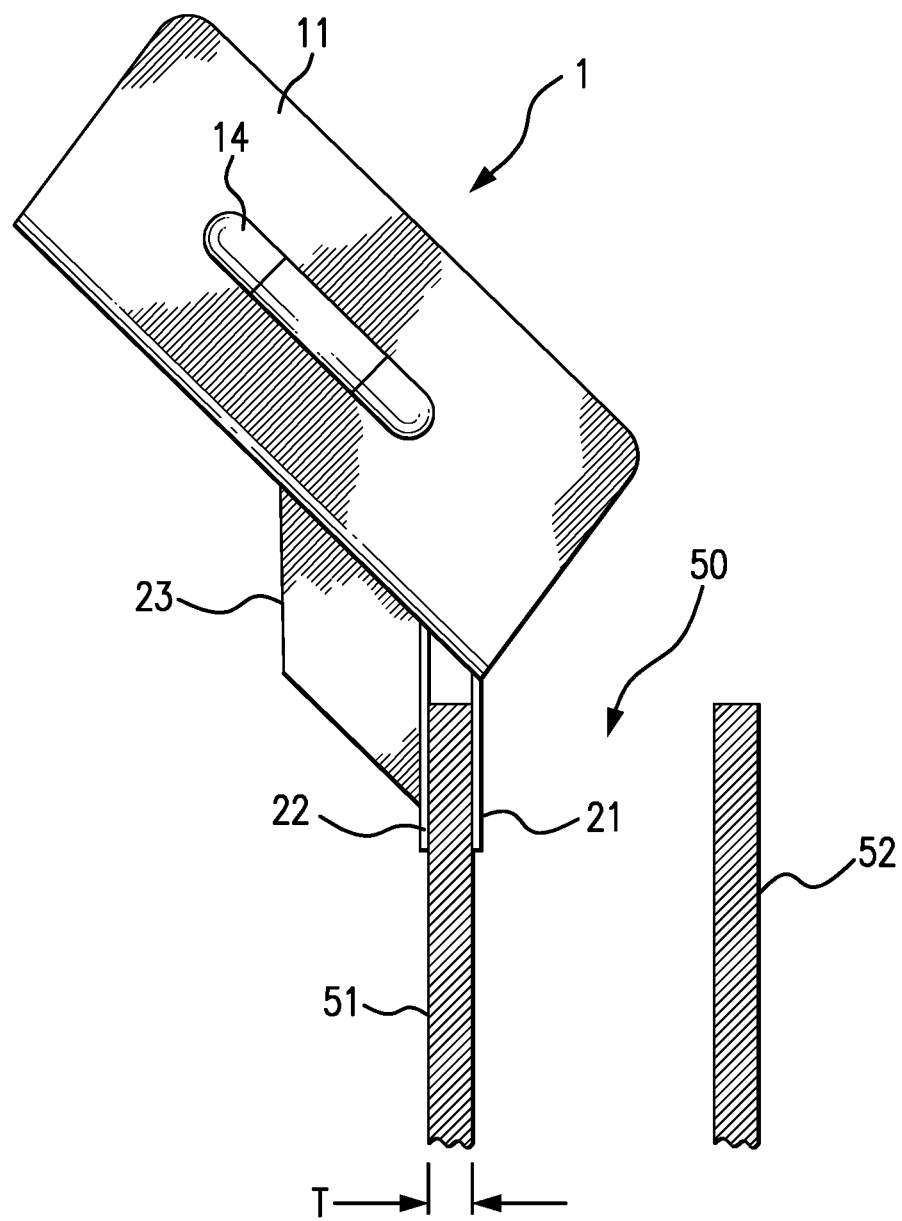
FIG. 5 is a side view of the concrete wall chute of FIG. 1 in use.

FIG. 5 shows the chute 1 in use, placed on top of a wall form panel 51, with the front end of the chute directed downward at approximately a 45° angle. The wall form panels 51, 52 define a space 50 into which the concrete is poured. The inner and outer flanges 21, 22 are spaced by a distance D slightly greater than the thickness T of panel 51. As best shown in FIG. 6, concrete deposited onto the floor of the chute is funneled toward the front, and flows off the front edge 20 into the wall form space 50. The inner flange 21 is adjacent to, and approximately flush with, the inner surface of panel 51. The outer flange 22 (not shown in FIG. 6) is adjacent to, and approximately flush with, the outer surface of panel 51.

Concrete may be poured from a mixing truck into the wall chute 1 from any direction. This arrangement permits a mixing truck to discharge the mixed concrete into the chute from any angle throughout a 360° approach at any reasonable flow rate. In particular, since the floor 10 of the chute is offset from the space 50, a worker may move the concrete within the wall without the interference of a mixing truck's chute suspended over the wall. The mixed concrete drops from the mixing truck's chute into the wall chute and the flow is then directed downwards into the wall.

The chute may be made of any material suitable for handling mixed and poured concrete. One exemplary chute is made of 11-gauge cold rolled steel for durability and light weight, although other gauges of steel and other metals, such as aluminum or an aluminum-base alloy may be utilized. Further, non-metals of sufficient durability, such as fiber-reinforced polymers may be used. The wall chute in this embodiment is light enough so that a worker can easily move the wall chute along the wall as needed while the worker is standing at either side of the wall, thus enabling quicker and more efficient pouring of concrete into the wall.

Figure 7:
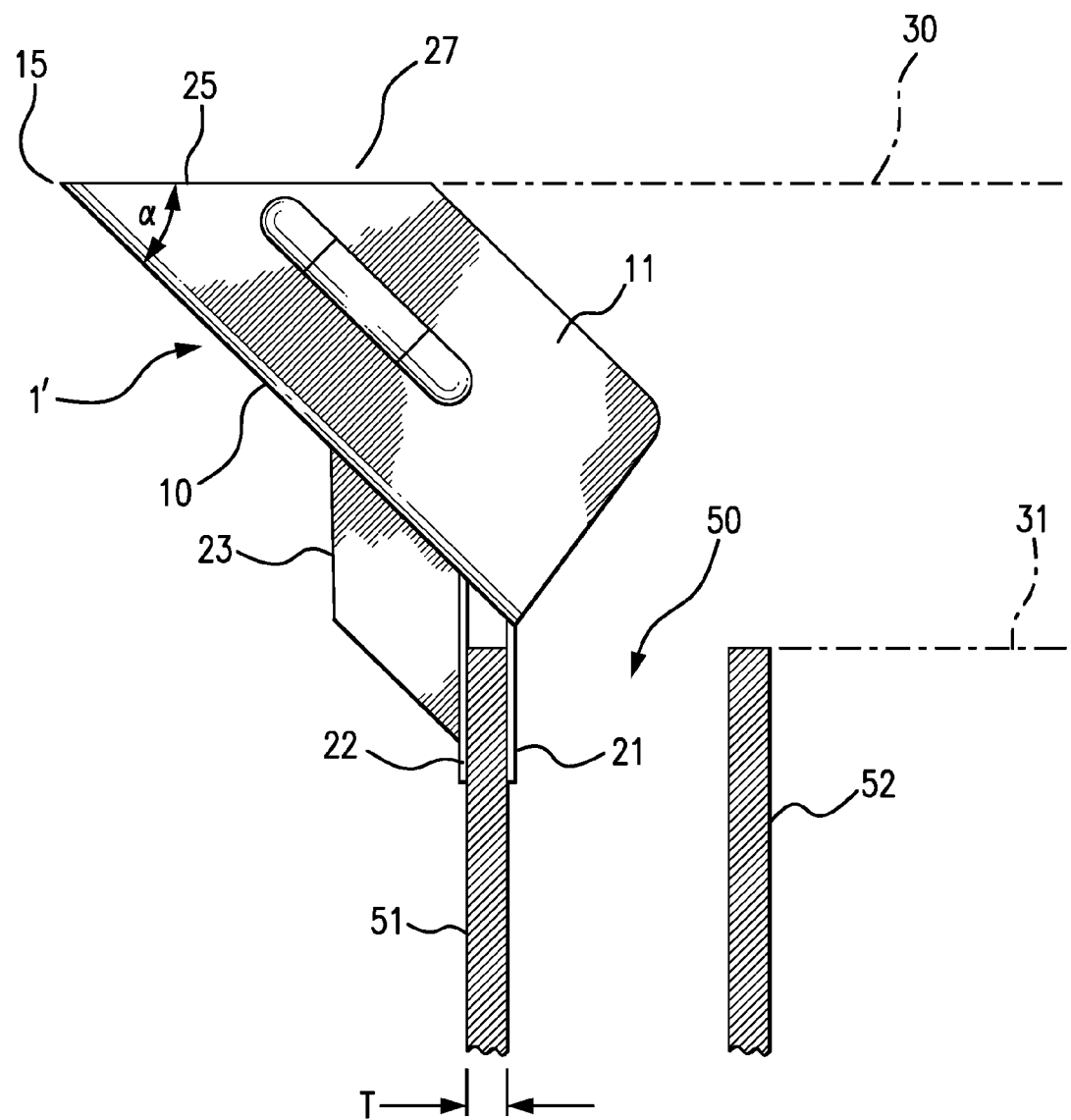
FIG. 7 is a side view of an alternative embodiment of the concrete wall chute.
Figure 8:
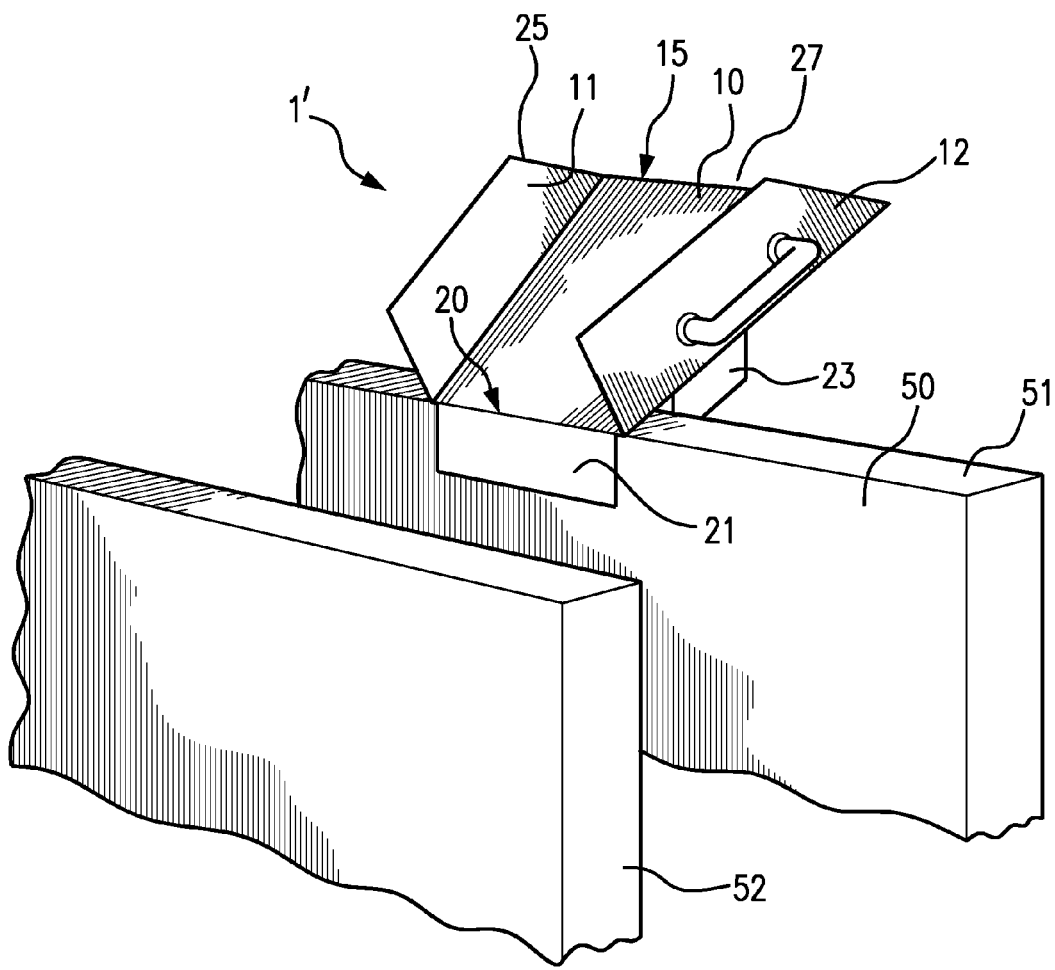
FIG. 8 is a front perspective view of the concrete wall chute of FIG. 7 in use.

FIG. 7 is a side view of an alternative embodiment of the concrete wall chute 1' and FIG. 8 is a front perspective view of the alternative embodiment concrete wall chute in use. A corner portion 25 of the sides 11, 12 adjacent to the rear edge 15 is omitted at an angle, α, of less than 90° relative to the floor 10. α is effective to cause the back walls 27 of the sides 11, 12 to be substantially co-planar with the opening of space 50 (see projection lines 30, 31) further enabling quick and efficient pouring of concrete into the wall. Preferably, α is about 45°.

While the wall chutes described herein are particularly suitable for pouring concrete, they are suitable for use with other fluid materials as well.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. A combination of a wall form and a chute configured for installation thereon for use in pouring a fluid material into said wall form, the wall form having a first wall form panel having a thickness and a second wall form panel spaced apart from said first wall form panel thereby defining a space for receiving the fluid material, the chute comprising:
   a floor with a front edge, a rear edge and side edges;
   sides connected to the floor along each of the side edges and projecting upward from the floor;
   a first flange connected to the floor along the front edge and projecting downward therefrom; and
   a second flange connected to the floor and projecting downward therefrom,
   wherein
      the first flange and the second flange are substantially parallel and spaced apart by a distance greater than said thickness of said first wall form panel, said distance effective to securely align the chute with the first wall form panel,
      so that placing the chute on top of the first wall form panel with the first flange interior to the wall form and the second flange exterior to the wall form securely aligns the chute with the first wall form panel whereby the chute floor is not suspended over the space,
   wherein the first flange and the second flange project downward from the floor at an angle of approximately 45°;
   and wherein
   the fluid material flows in a direction towards the space when applied to the chute from any direction.

2. The chute according to claim 1, wherein said spacing distance of the first flange and the second flange is approximately equal to the thickness of the first wall form panel.

3. The chute according to claim 1, further comprising a reinforcing gusset connected to the floor of the chute and projecting downward therefrom, and connected to the second flange.

4. The chute according to claim 2, wherein the floor has a trapezoidal shape with the rear edge longer than the front edge.

5. The chute according to claim 1, further comprising a handle attached to a side at an exterior surface thereof.

6. The chute according to claim 1 wherein said fluid material is concrete.

7. The chute according to claim 1 wherein backwalls of the sides project upwardly from the floor at an angle, relative to the floor, of less than 90°.

8. The chute according to claim 1 wherein backwalls of the sides project upwardly from the floor at an angle effective to cause said backwalls to be substantially co-planar with tops of said wall form panels.

9. The chute according to claim 8 wherein said fluid material is concrete.

* * * * *